Feb. 17, 1931.　　S. H. HOPKINS　　1,793,401
DAVIT TACKLE HOOK
Filed Jan. 25, 1930　　2 Sheets-Sheet 1
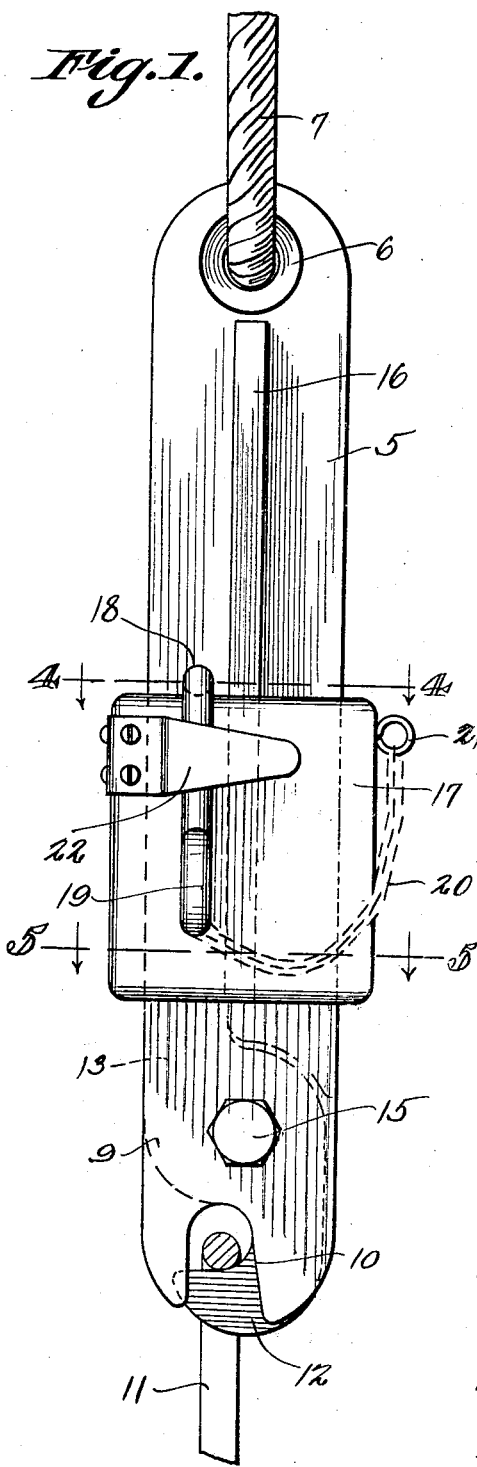
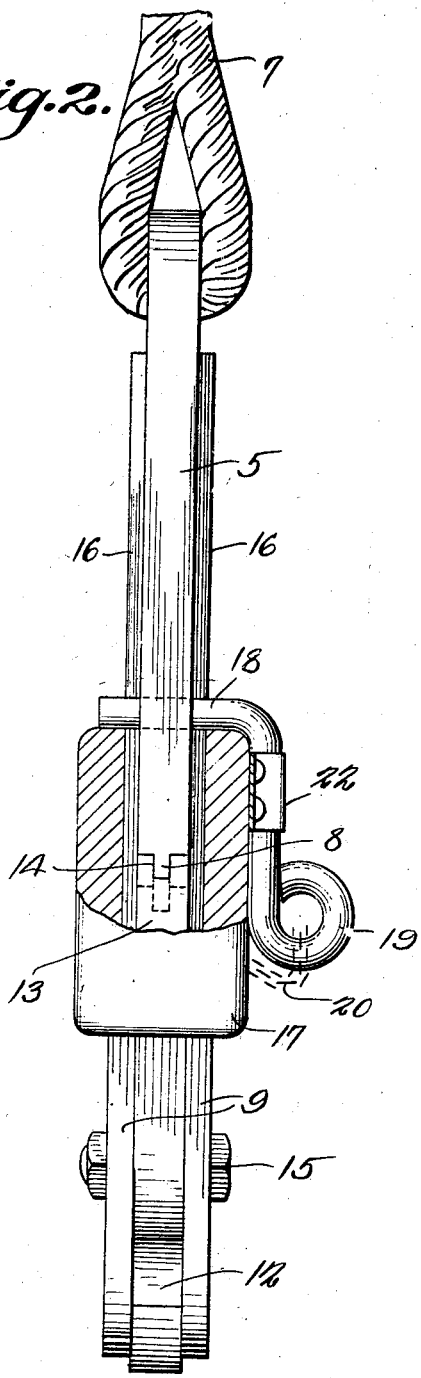
Seth H. Hopkins Inventor
By C. A. Snow & Co.
Attorneys.

Feb. 17, 1931.  S. H. HOPKINS  1,793,401
DAVIT TACKLE HOOK
Filed Jan. 25, 1930  2 Sheets-Sheet 2

Seth H. Hopkins
Inventor
By C. A. Snow & Co.
Attorneys.

Patented Feb. 17, 1931

1,793,401

UNITED STATES PATENT OFFICE

SETH H. HOPKINS, OF BAR HARBOR, MAINE

DAVIT-TACKLE HOOK

Application filed January 25, 1930. Serial No. 423,480.

This invention relates to hooks especially designed for use in connection with davit tackles, the primary object of the invention being to provide a hook which may be readily and easily operated to release the life boat to which the hook is connected.

An important object of the invention is to provide a hook of this character which will be securely locked in its closed or active position, the construction of the hook being such that accidental displacement of the hook will be prevented at all times.

A still further object of the invention is the provision of a hook which will automatically release, when the same has been unlocked, and when a pull is directed to the davit tackle to which the hook is connected.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a davit tackle hook constructed in accordance with the invention.

Figure 2 is an elevational view taken at right angles to Figure 1, parts thereof being shown in section.

Figure 3:
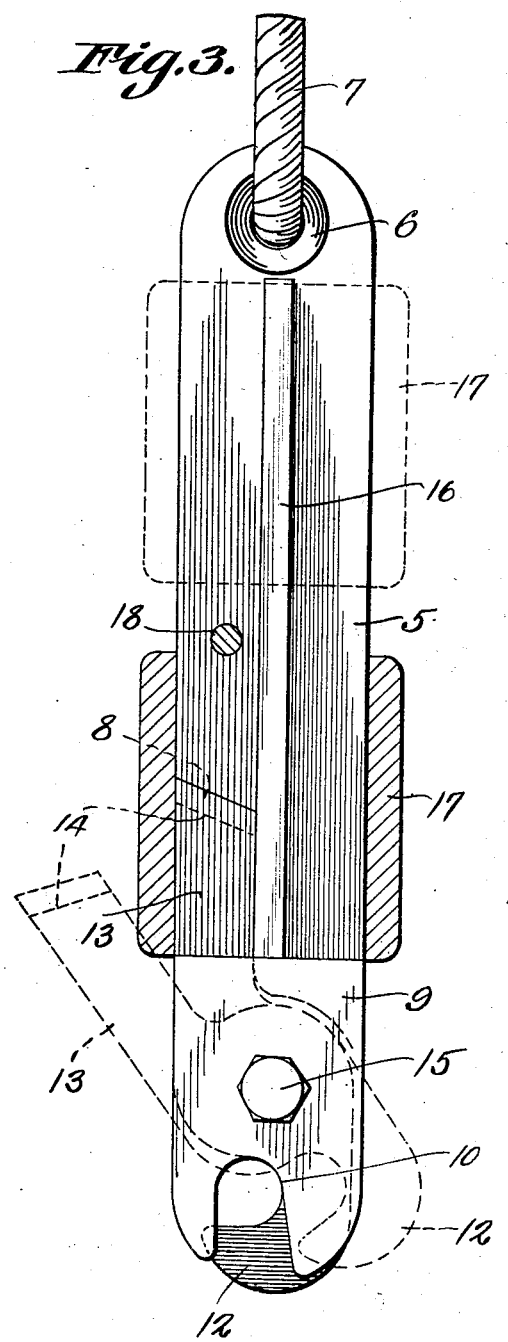
Figure 3 is a side elevational view of the hook, the locking sleeve being shown in section.
Figure 4:
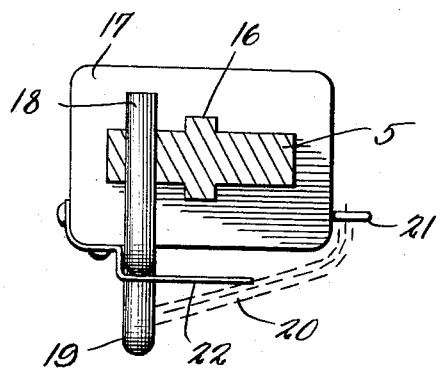
Figure 4 is a sectional view taken on line 4—4 of Figure 1.
Figure 5:
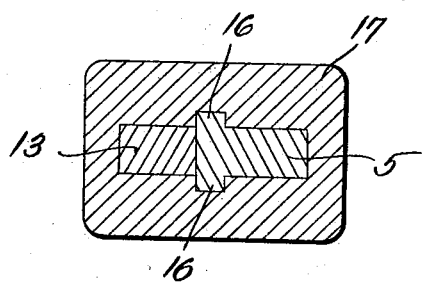
Figure 5 is a sectional view taken on line 5—5 of Figure 1.

Referring to the drawings in detail, the body portion of the hook is indicated generally by the reference character 5, and is provided with an opening 6 at one end thereof, for the reception of the davit tackle 7.

One side of the body portion is cut away defining a rib 8 at one end thereof, there being provided spaced plates 9 secured to the lower end of the body portion on opposite sides thereof at a point beyond the cut away portion.

The plates 9 are formed with notches 10 for the reception of the boat ring which is indicated by the reference character 11. Pivotally mounted between the plates 9, is a hook 12 which has an arm 13 formed integral therewith, the arm 13 being provided with a groove 14 in the end thereof, the groove being designed to receive the rib 8 when the hook is moved to its active position, to hold the hook against lateral movement, and relieve the pivot pin, which is indicated at 15, of undue strain.

Ribs 16 are formed on the sides of the body portion and extend from the inner edges of the plates 9, to points adjacent to the opening 6, said ribs acting as guides for the locking sleeve 17, which is formed with grooves to accommodate the ribs so that the locking sleeve is guided in its movements. It might be further stated that the arm 13 is of a width equal to the width of the body portion, to the end that the locking sleeve may pass over the arm and lock the arm and hook against movement.

An opening is formed in the body portion, and is located at a point in proximity to one end of the locking sleeve 17, when the sleeve is in its active position, the opening being provided for the reception of the locking pin 18 which is formed with an eye 19 at one end for the reception of an end link of the chain 20, which has its opposite end connected to the eye bolt 21 to the end that the pin 18 will be held to the locking sleeve at all times.

Secured to the locking sleeve is a spring finger 22 which is spaced from the locking sleeve and supported in parallel relation therewith so that the pin 18 may be moved to a position under the finger, as shown by Figure 1 of the drawings, to hold the pin against movement under normal conditions.

From the foregoing it will be obvious that due to this construction, a boat supported by the hook may be readily released from the hook, by merely rotating the pin 18 and removing the pin from the opening in the body portion in which it is positioned. The locking sleeve 17 is now moved longitudinally of the body portion towards the tackle 7, thereby freeing the arm 13 and allowing the hook 12 to swing under the weight of the boat, releasing the boat.

I claim:

1. A hook for davit tackles, comprising a body portion, said body portion having an opening at one end thereof, a hook member including an arm, pivotally mounted within the opening, said body portion having a cut away portion to receive the arm, the sides of said arm being flush with the sides of the body portion, a locking sleeve slidable over the body portion and arm to lock the hook member against movement, and means for locking the sleeve against movement on the body portion.

2. A hook for davit tackles, comprising a body portion, ribs formed on the body portion and disposed longitudinally thereof, a pivoted hook member on the body portion, a sleeve having grooves to receive the ribs, said sleeve adapted to move longitudinally of the body portion and engage the pivoted hook member to hold the pivoted hook member in its active position, and said body portion having an opening to receive a davit tackle.

3. A hook comprising a body portion, said body portion having an opening at one end thereof, and having a cut away portion extending inwardly from one edge thereof, a hook member pivotally mounted within the opening, said hook member including an arm, said arm adapted to move into the cut away portion, a locking sleeve slidably mounted on the body portion and adapted to engage the arm of the hook member for locking the hook member in its active position, and said body portion having an opening to receive a davit tackle.

4. A hook comprising a body portion, plates at one end of the body portion, said plates being spaced apart to provide an opening, said body portion having one of its edges cut away defining an inclining wall, a rib on the wall, a hook member pivotally mounted between the plates, an arm forming a part of the hook member, one end of the hook member being inclined and provided with a groove, said groove adapted to receive the rib to hold the arm against lateral movement, and a sliding locking sleeve for engaging the arm and locking the hook member in its active position.

5. A hook comprising a body portion, a hook member pivotally mounted at one end of the body portion, a locking sleeve slidable over the body portion and adapted to engage the hook member to hold the hook member in its active position, said body portion having an opening, a locking pin adapted to be positioned in the opening to engage one end of the locking sleeve to hold the sleeve against movement, and means on the sleeve and engaging the locking pin to secure the locking pin against displacement.

In testimony that I claim the foregoing as my own, I have hereto affixed my signature.

SETH H. HOPKINS.